M. K. LEWIS.
Carriage-Brake.
No. 38,752.
Patented June 2, 1863.
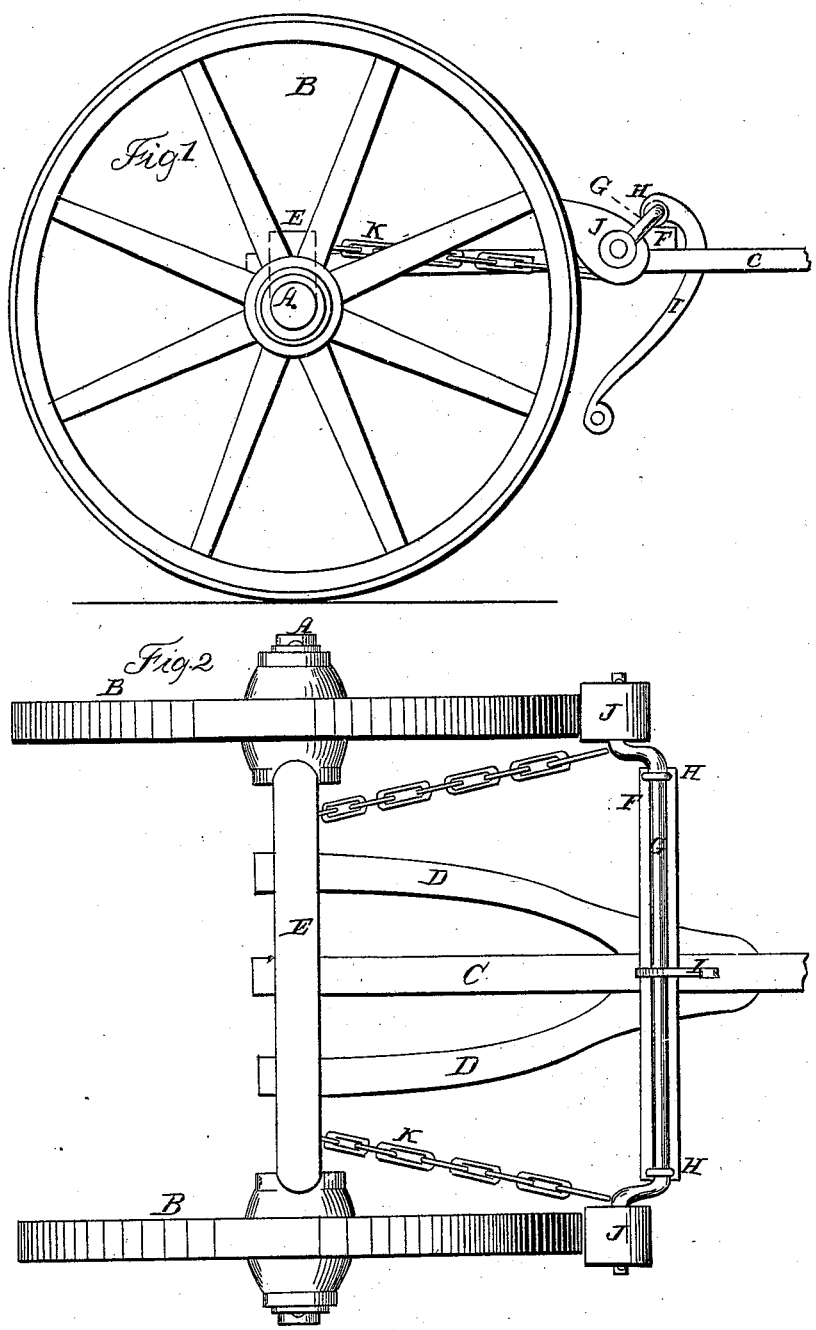

UNITED STATES PATENT OFFICE.

MILES K. LEWIS, OF IOWA CITY, IOWA.

IMPROVEMENT IN CARRIAGE-BRAKES.

Specification forming part of Letters Patent No. 38,752, dated June 2, 1863.

*To all whom it may concern:*

Be it known that I, MILES K. LEWIS, of Iowa City, in the county of Johnson and State of Iowa, have invented certain new and useful Improvements in Carriage-Brakes; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 represents the axle and wheels of a carriage with my improvements. Fig. 2 is a plan or top view of the same.

The nature of my improvements in carriage-brakes consists in combining with a cam-shaped brake-block arranged to turn on the bake-bar some links or chains to connect the block to the axle or carriage, so that when the brake is applied to the wheel the chain will tend to draw the block against the wheel, combining a crank-shaped brake-bar with a cam-shaped brake-block.

In the accompanying drawings, A is the axle; B B, the rear wheels of a carriage; C, the perch, supported by the hounds D D, as shown in Fig. 2 of the drawings. The top bar E is fastened on the top of the axle A, so as to clamp the perch and hounds to the axle. The bar F is fastened to or across the perch and hounds to support the brake-bar G which is arranged to turn in stands H H on the bar F, and is worked by the lever I, which is fastened to it (the brake-bar) for that purpose. The brake-bar G is made in the form of a crank at each end beyond the ends of the bar F, and the cam-shaped brake-blocks J J, made in the form shown in Fig. 1, are applied on the cranks of the brake shaft or bar G, and are connected by the chains K K to the top bar, E, or may be connected to the axle, if preferred that way. The chains K K are fastened to brake-blocks some distance below the crank and diametrically opposite to the point of the cam or block, so that when the cam-block is applied to and rolled by the wheel, the chain is drawn tight in a direction to draw the block against the wheel, so that the friction of the wheel upon the block aids materially by means of the chain in drawing the block against the wheel. The lever I, which applies the brake, may be connected to the pole or tongue of the carriage, as described in my patent dated April 8, 1862, or a lever may be applied to the brake-shaft and made to extend up by the side of the carriage so as to be operated by the driver.

My improved cam-shaped brake-block has the hole in it for the brake-shaft on which it turns some distance from the center toward one side, and it is so arranged that when it is applied to the wheel it turns on the brake-bar until the thick or wide side of the cam comes against the wheel, when the chain prevents it from turning farther, and at the same time holds and tends to draw it against the wheel, and at the same time it leaves the wheel free to turn back, for if the team pushes back so as to start the wheel backward, it releases the brake-block instantly, and turns the narrow or thin side of the block toward the wheel and slacks the chain, leaving the wheel free to turn backward as long as required. The tongue or pole having arrived at the end of the slot, which permits it to traverse, the block hangs free, so that the team can start forward again at the proper time, and the brake-block remain released until it is required again, when the wheel turns the thick side of the block against itself, as before stated.

I propose to apply my improvements to coaches, railroad-cars, and other wheeled vehicles.

I believe I have described and represented my improved carriage-brake so as to enable any person skilled in the art to make and use it without further invention or experiment.

I will now state what I desire to secure by Letters Patent—

1. In combination with a cam-shaped brake-block, arranged to turn on the brake-bar, the links or chains which connect it to the axle or some part of the carriage, substantially as described, for the purpose set forth.

2. In combination with a crank-shaped brake-bar, a cam-shaped brake-block, for the purpose set forth.

MILES K. LEWIS.

Witnesses:
H. D. MACKAY,
FRANK B. BANKS, Jr.